(12) United States Patent
Kojori

(10) Patent No.: US 7,112,944 B1
(45) Date of Patent: Sep. 26, 2006

(54) ELECTRICAL POWER SYSTEM FOR MULTI-USE POWER CONDITIONING AND ENGINE START

(75) Inventor: Hassan A. Kojori, Mississauga (CA)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 11/108,770

(22) Filed: Apr. 19, 2005

(51) Int. Cl.
*F02N 11/00* (2006.01)
*H02P 9/00* (2006.01)

(52) U.S. Cl. .................. 322/29; 290/31; 290/38 R

(58) Field of Classification Search ............... 363/15, 363/37; 290/31, 38 R, 40 B, 40 F, 46, 47; 322/10, 22, 29, 45; 307/46, 82
See application file for complete search history.

(56) References Cited

U.S. PATENT DOCUMENTS

| | | | | |
|---|---|---|---|---|
| 5,015,941 A | * | 5/1991 | Dhyanchand | 322/10 |
| 5,325,042 A | | 6/1994 | Murugan | |
| 5,546,742 A | | 8/1996 | Shekhawat | |
| 5,587,647 A | * | 12/1996 | Bansal et al. | 322/45 |
| 5,594,322 A | * | 1/1997 | Rozman et al. | 322/10 |
| 5,929,537 A | * | 7/1999 | Glennon | 307/46 |
| 5,977,645 A | * | 11/1999 | Glennon | 290/40 F |
| 5,998,976 A | | 12/1999 | Steffan | |
| 6,281,595 B1 | * | 8/2001 | Sinha et al. | 290/40 A |
| 6,487,096 B1 | | 11/2002 | Gilbreth et al. | |
| 6,812,586 B1 | * | 11/2004 | Wacknov et al. | 290/52 |
| 2002/0126518 A1 | | 9/2002 | Lazarovich | |
| 2003/0015873 A1 | | 1/2003 | Khalizadeh et al. | |
| 2003/0218887 A1 | | 11/2003 | Kojori et al. | |
| 2004/0027077 A1 | | 2/2004 | Xu et al. | |

\* cited by examiner

*Primary Examiner*—Adolf Berhane
(74) *Attorney, Agent, or Firm*—Birch, Stewart, Kolasch & Birch, LLP

(57) ABSTRACT

A synchronous and bi-directional power conversion module (140) for use in a variable frequency power conversion system (100) comprises a first input/output side (142) for AC power input/output and DC power source input; a second input/output side (144) for DC link connection; and an active power switching arrangement (Q1–Q6), which is controlled by a gating pattern to perform multi-mode power conversion. The active power switching arrangement (Q1–Q6) is controlled to convert DC link voltage from the DC link connection (144) to an AC load supply voltage during a forward power mode; convert AC input power from the first input/output side (142) to a regulated DC link voltage during an AC source input, reverse power mode; and convert DC input power from the first input/output to a regulated DC link voltage during a DC source input, reverse power mode.

20 Claims, 6 Drawing Sheets

ELECTRICAL POWER SYSTEM FOR MULTI-USE POWER CONDITIONING AND ENGINE START

FIELD OF THE INVENTION

The present invention relates to electrical power systems, and more particularly to an electrical power conversion system that achieves multi-purpose power conditioning for generator power flow and starter power flow operating modes.

BACKGROUND OF THE INVENTION

As an alternative to conventional fixed frequency power generation systems, recent aerospace applications have utilized variable frequency generators that typically deliver electrical power at frequencies between 320 and 800 Hz. In one such application, a synchronous machine (e.g., a brushless synchronous machine) operates in a first mode as a generator to convert mechanical energy from a prime mover, such as a gas turbine engine, into variable frequency AC power and operates in a second mode as a main or auxiliary power unit starter to convert electrical power into mechanical power, which is supplied to the prime mover until it reaches a self-sustaining speed.

Traditionally, an auxiliary power unit (APU) start power system architecture has two main subsystems: a start power unit (SPU); and a start converter unit (SCU). FIG. 1 illustrates a conventional aircraft power system 10, which includes: a synchronous machine 20; an SCU 30; and an SPU 40. The SCU 20 includes a first inverter 32, which supplies multi-phase AC power to the synchronous machine 20 during a starter mode. The SCU 30 includes a second inverter 34 to provide the exciter power supply field for the synchronous machine 20.

The SPU 40 includes an AC to DC converter 42 and a DC to DC converter 44. When connected to an AC input power source during the starter mode, the AC-DC converter 42 converts AC power from the AC input power source (e.g., supplying 115 VAC) to a DC bus/link voltage, typically around 270 VDC or higher. In FIG. 1, the AC input power source is illustrated as an aircraft start ground panel 64. When connected to an on-board DC power source (battery) 62 or a ground-based DC power source (aircraft start ground panel 64) during the starter mode, the DC—DC converter 44 converts input DC power to the DC bus voltage. The DC input power is typically 28 VDC. During starter mode, the first inverter 32 converts DC power from the SPU 40 to a three-phase voltage for the stator windings of the synchronous machine 20. Furthermore, the second inverter 34 converts the DC power from the SPU 40 to an Exciter Power Supply (EXPS) voltage. The first inverter 32, the second inverter 34, the AC-DC converter 42, and the DC—DC converter 44 are typically provided as discrete units ("boxes"), thereby each requiring a separate DC link. Although not shown, the first inverter 32, the second inverter 34, and the DC—DC converter 44 include individual controllers in this conventional arrangement. In this arrangement, DC bus regulation is performed by a generator control unit (GCU, not shown), through a point of regulation either at the input three-phase AC power or at the DC bus.

During generator mode, the AC-DC converter 42 of the SPU 40 converts multi-phase AC power from the synchronous machine 20 into a DC bus voltage. The AC-DC converter 42 performs passive rectification and is comprised of a three-phase diode bridge in this conventional arrangement. The first inverter 32 of the SCU 30 converts the DC bus voltage to variable voltage (VV), fixed frequency (FF) or variable frequency (VF) power to supply aircraft load(s).

As illustrated, power flow in the conventional arrangement of FIG. 1 is not bi-directional and is managed using at least the following electrical contactors: a first contactor 50-1 between the synchronous machine 20 and the AC side of the first inverter 32; a second contactor 50-2 between the synchronous machine 20 and the AC side of the AC-DC converter 42; a third contactor 50-3 between the first inverter 32 and aircraft load(s); a fourth contactor 50-4 between external DC power source 64 and the DC—DC converter 44; a fifth contactor 50-5 between the external AC power source 64 and the AC side of the AC-DC converter 42; and a sixth contactor 50-6 between aircraft battery 62 and the DC—DC converter 44. Opened/closed states for these various electrical contactors to achieve different operating modes are shown below in Table 1, wherein "C" represents a closed contactor state and "O" represents an opened contactor state.

TABLE 1

| Starter/Gen. Modes | Different Modes of Operation | | | | | |
|---|---|---|---|---|---|---|
|  | 50-1 | 50-2 | 50-3 | 50-4 | 50-5 | 50-6 |
| SM Start Ground DC | C | O | O | C | O | O |
| SM Start Aircraft DC | C | O | O | O | O | C |
| SM Start Ground AC | C | O | O | O | C | O |
| SM Generate | O | C | C | O | O | O |

This particular arrangement of electrical contactors is required in part due to uni-directional power flow requirements. Furthermore, thermal management and DC linking for the SCU 30 and the SPU 40 are fragmented. This is illustrated in FIG. 1 as separate heat sinks and DC links for SCU and SPU components (heat flow being represented as cross-hatched arrows). Separate connectors (power and discrete input/output) are typically required. Thus, overall system weight, volume, and cost are increased and reliability is reduced due to increased part count.

SUMMARY OF THE INVENTION

In one aspect, the present invention relates to a synchronous and bi-directional power conversion module for use in a variable frequency power conversion system. In one embodiment of the present invention, the power conversion module comprises: a first input/output side for AC power input/output and DC power source input; a second input/output side for DC link connection; and an active power switching arrangement, which is controlled by a gating pattern to perform multi-mode power conversion. The active power switching arrangement is controlled to: convert DC link voltage from the DC link connection to an AC load supply voltage during a forward power mode; convert AC input power from the first input/output side to a regulated DC link voltage during an AC source input, reverse power mode; and convert DC input power from the first input/output side to a regulated DC link voltage during a DC source input, reverse power mode.

Another aspect of the present invention relates to a multi-mode power conversion system in which a synchronous machine operates as a generator during a forward power mode and a starter during a reverse power mode. The system comprises: a first multi-mode power conversion module, having an AC input/output connected to the synchronous machine, a DC input/output connected to a DC link, and an active power switching arrangement for converting multi-phase AC power from the synchronous machine to regulated DC link voltage during the forward power mode and converting DC link voltage to multi-phase AC power for supply to the synchronous machine during the reverse power mode; and a second multi-mode power conversion module, having a first input/output side for AC power input/output, a second input/output side for DC link connection, and an active power switching arrangement, wherein the active power switching arrangement is controlled to convert DC link voltage from the DC link connection to an AC load supply voltage during the forward power mode and convert AC input power from the first input/output side to a regulated DC link voltage during a reverse power mode, wherein the multi-mode power conversion system includes an electrical contactor between the first multi-mode power conversion module and the synchronous machine that is closed during both the forward power mode and the reverse power mode and does not include an electrical connection or electrical contactor between the first input/output side of the second multi-mode power conversion module and the synchronous machine.

The multi-mode conversion system according to another embodiment comprises: a first multi-mode power conversion module, having an AC input/output connected to the synchronous machine, a DC input/output connected to a DC link, and an active power switching arrangement for converting multi-phase AC power from the synchronous machine to regulated DC link voltage during the forward power mode and converting DC link voltage to multi-phase AC power for supply to the synchronous machine during the reverse power mode; and a second multi-mode power conversion module, having a first input/output side for AC power input/output and DC power source input, a second input/output side for DC link connection, and an active power switching arrangement. The active power switching arrangement of the second multi-mode power conversion module is controlled to: convert DC link voltage from the DC link connection to an AC load supply voltage during the forward power mode; convert AC input power from the first input/output side to a regulated DC link voltage during an AC source input, reverse power mode; and convert DC input power from the first input/output side to a regulated DC link voltage during a DC source input, reverse power mode.

BRIEF DESCRIPTION OF THE DRAWINGS

Further aspects of the present invention will become apparent from the following description taken in conjunction with the accompanying drawings, in which.

DETAILED DESCRIPTION

Embodiments of the present invention are described below with reference to the appended Figures. Although these embodiments are described in the context of aerospace applications, and are applicable to "more electric aircraft" platforms, it should be recognized that principles of the present invention may be applied to other technical environments.

Figure 2A:
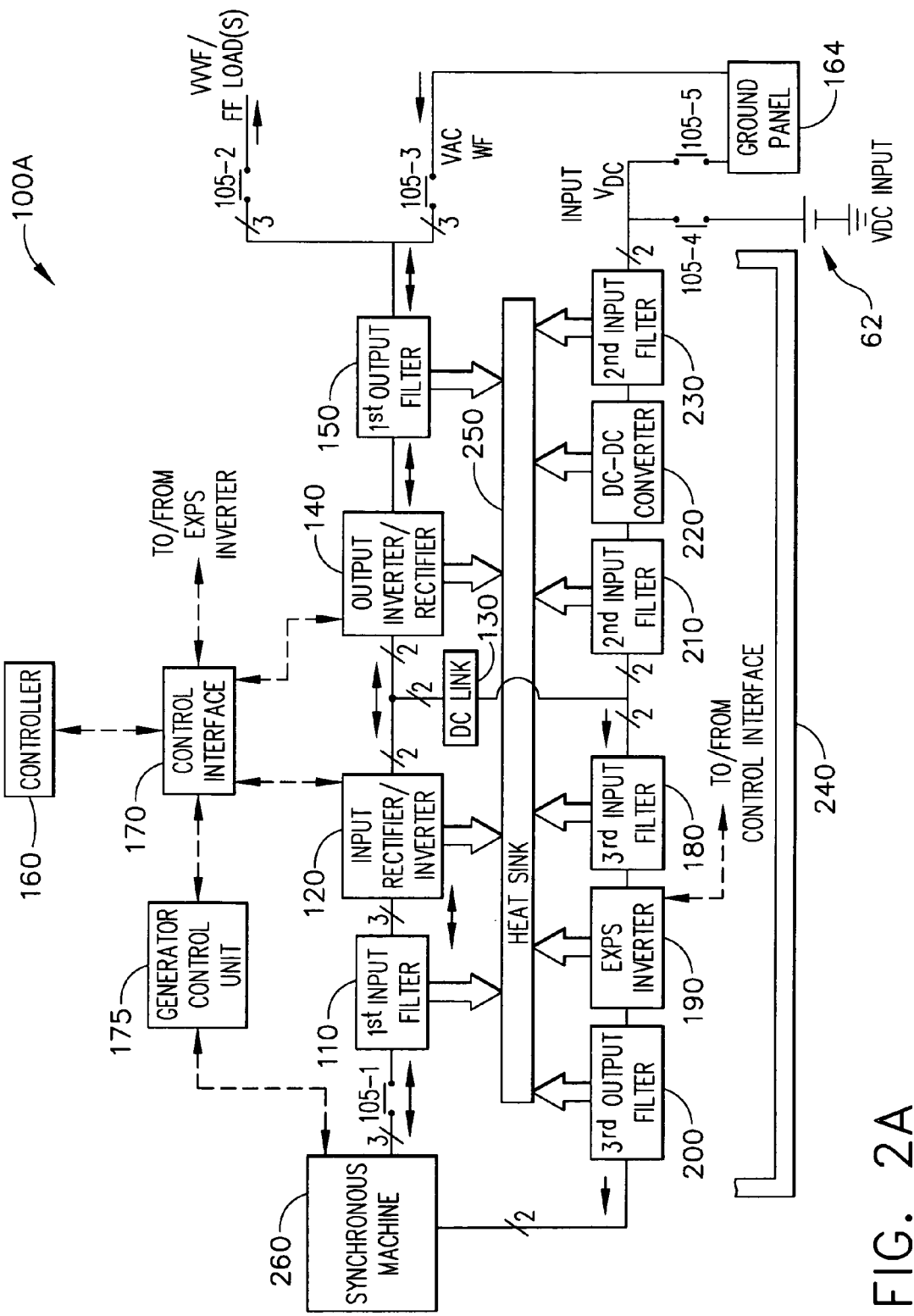
FIG. 2A illustrates an electrical power system utilizing a synchronous machine as both a generator and a starter in accordance with an embodiment of the present invention.

One embodiment of the present invention is an electrical power system that incorporates bi-directional power conversion modules for multi-mode power conditioning. FIG. 2A is a block diagram illustrating an electrical power system 100A according to this embodiment of the present invention. As illustrated, the electrical power system 100A includes: a synchronous machine 260, such as a brushless synchronous machine; an input (front-end) rectifier/inverter 120, connected to the synchronous machine 260 through a first input filter 110; an output inverter/rectifier 140, connected with a first output filter 150 to supply power to variable voltage (VV), variable frequency (VF) or fixed frequency (FF) load(s); a controller 160; a control interface 170; a generator control unit 175; a heat sink 250; and a DC link/bus 130. The first input filter 110, the input rectifier/inverter 120, the output inverter/rectifier 140, the first output filter 150, and the DC link bus 130 are connected to the heat sink 250 for thermal management.

The power system 100A further includes elements for conditioning input DC power, supplied from a ground-based or on-board source, for exciter power supply. These elements include: a second input filter 230; a DC—DC converter 220, e.g., for converting 28 VDC to a regulated DC voltage such as 270 VDC or higher; a second output filter 210; a third input filter 180; an exciter power supply (EXPS) inverter 190, which converts DC voltage from the DC—DC converter 220 to an exciter power supply voltage; and a third output filter 200. These elements are all connected to the heat sink 250 for thermal management.

In the embodiment of FIG. 2A, the first output filter 150 is connected to a ground panel 164 for providing ground-based AC input power during an AC input, start operating mode. The second input filter 230 is connected to the ground panel 164 for providing ground-based DC input power during a ground DC input, start operating mode. The second input filter 230 is connected to an on-board DC battery 162 for providing battery DC input power during a battery DC input, start operating mode.

Figure 1:
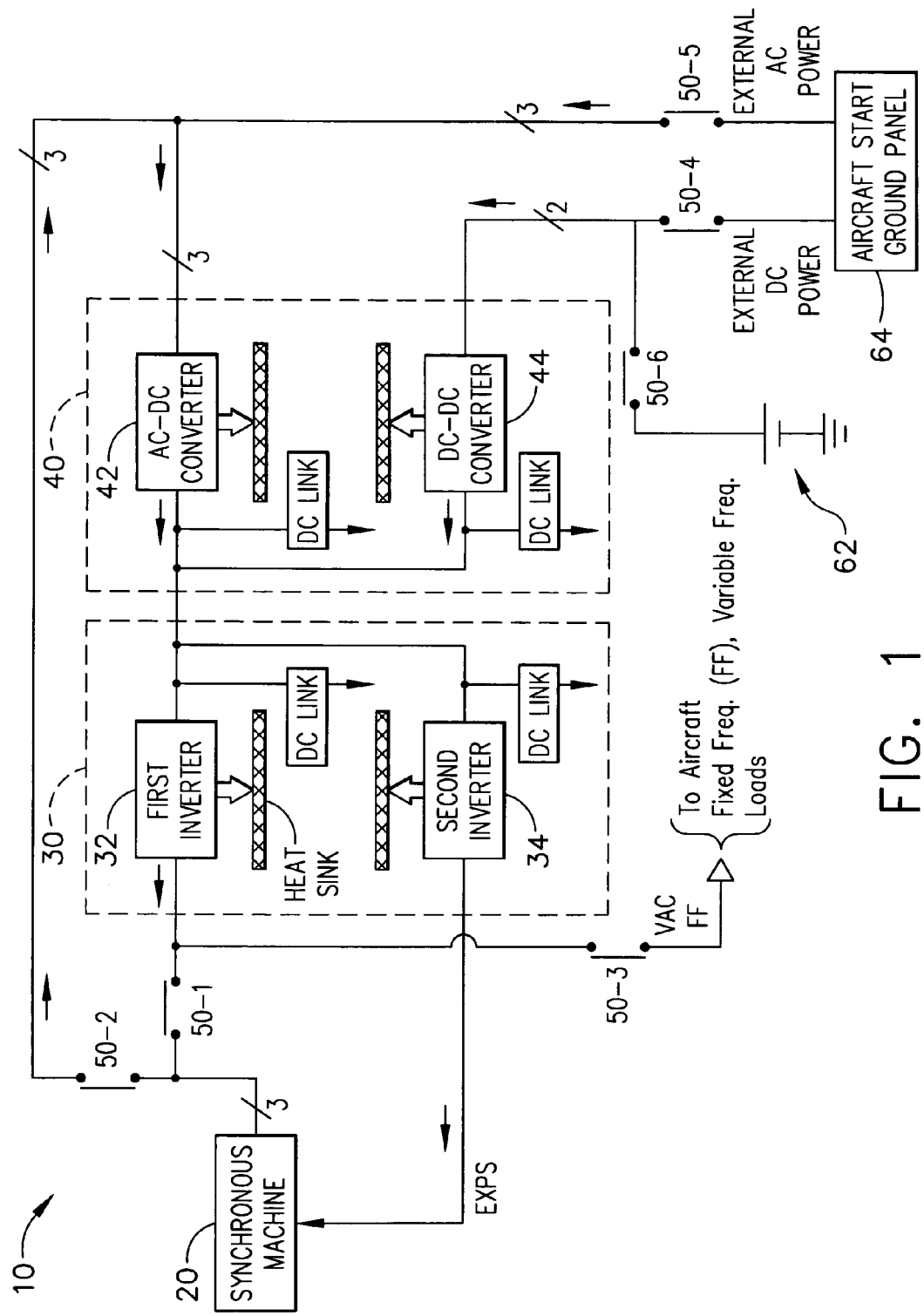
FIG. 1 illustrates a conventional aircraft power system utilizing a synchronous machine as both a generator and a starter.

Electrical contactors 105-1, 105-2, 105-3, 105-4, and 105-5 are provided between the synchronous machine 260 and the first input filter 110; between the first output filter 150 and the load(s); between the first output filter 150 and the input AC power source (ground panel 164); between the second input filter 230 and the DC battery 162; and between the second input filter 230 and the ground-based input DC power source (ground panel 164), respectively. As compared to the conventional multi-mode system illustrated in FIG. 1, no electrical connection/contactor is needed between the synchronous machine 260 and the AC side of the output inverter/rectifier 140. Furthermore, the electrical contactor 105-1 between the synchronous machine 260 and the AC side of the input rectifier/inverter 120 remains closed during both is only needed for protection. Interlock circuitry is not shown and can be implemented in hardware or software controls for each AC/DC contactor. Opened/closed states for these various electrical contactors to achieve different operating modes are shown below in Table 2.

TABLE 2

Different Modes of Operation

| Starter/Gen. Modes | 105-1 | 105-2 | 105-3 | 105-4 | 105-5 |
|---|---|---|---|---|---|
| SM Start Ground DC | C | O | O | O | C |
| SM Start Aircraft DC | C | O | O | C | O |
| SM Start Ground AC | C | O | C | O | O |
| SM Generate | C | C | O | O | O |

In the embodiment of FIG. 2A, all of the power conversion modules are integrated on the heat sink 250 and controlled by the digital controller 160 in the forward or reverse power flow modes as required. As discussed further below, this architecture allows multi-mode use of the same power conversion modules and results in significant cost, weight and volume reduction, which is particularly beneficial for achieving fuel economy, ease of thermal management, packaging and maintenance in aerospace applications.

In a forward power flow mode, wide frequency VF power (e.g., 320 to 800 Hz) from the synchronous machine 260, operating as a generator, is converted to regulated DC power (DC link voltage) by the input rectifier/inverter 120. The resulting DC power is conditioned by the output inverter/rectifier 140 to provide VV, VF or FF power for various electrical loads.

Figure 2B:
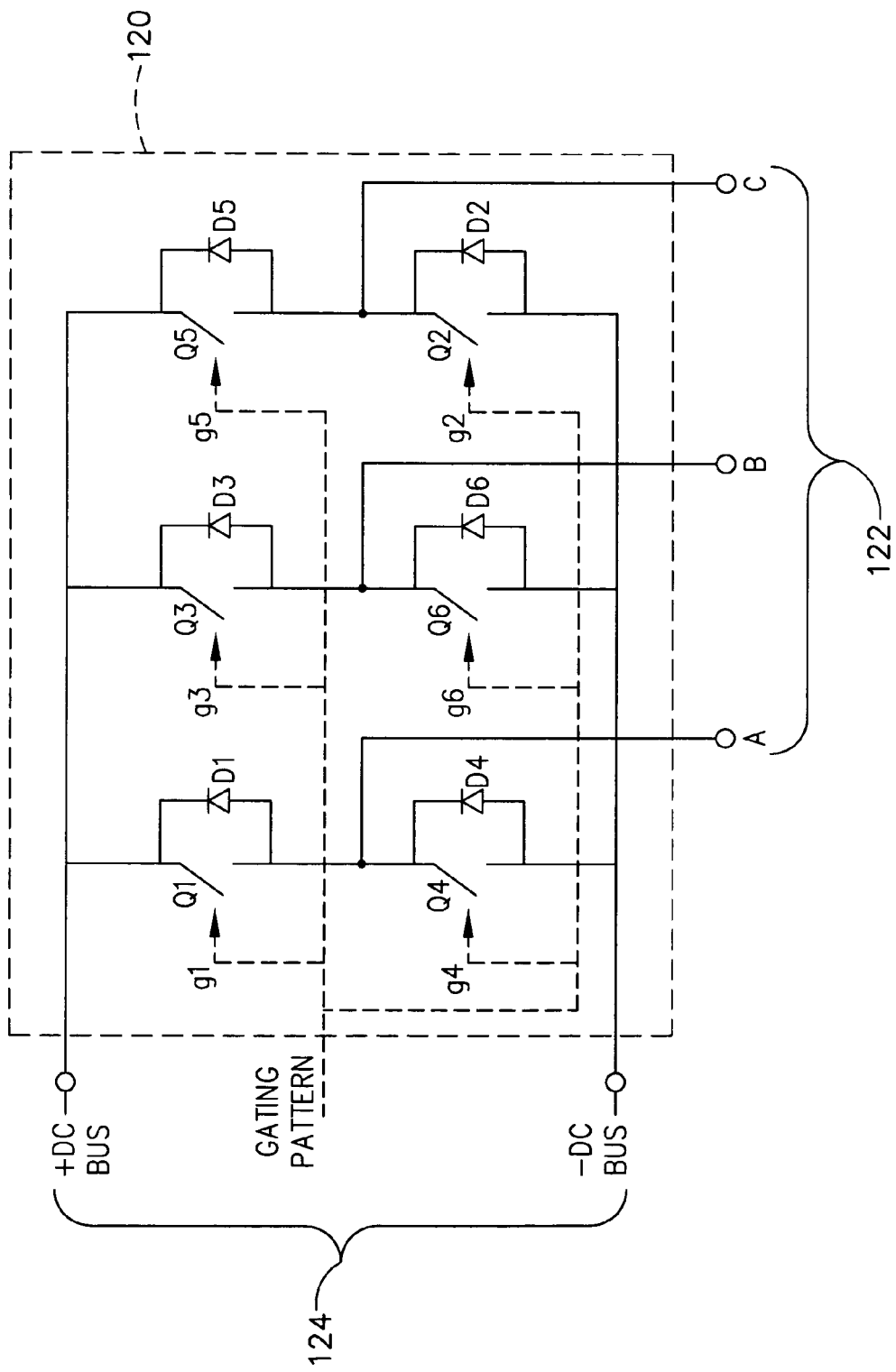
FIG. 2B illustrates a bi-directional voltage source inverter, which is used for multi-mode power conditioning according to an implementation of the present invention.

FIG. 2B is a circuit diagram illustrating an arrangement for the input rectifier/inverter 120 according to one implementation of the present invention. In this implementation, the input rectifier/inverter 120 is a bi-directional voltage source inverter (VSI) comprised of six controlled devices, illustrated as insulated gate bipolar transistors (IGBTs) Q1–Q6 controlled by gating signals g1–g6, with anti-parallel diodes D1–D6. The VSI illustrated is FIG. 2B comprises three legs in total (two IGBTs with anti-parallel diodes per each leg), with the mid points of the VSI connected via a connection on an AC input/output side 122 to the first input filter 110. Other controlled devices, such as MOS controlled thyristors (MCTs), bipolar junction transistors (BJTs), silicon controlled rectifiers (SCRs), etc., can be used. The input rectifier/inverter 120 is also connected to the DC link on a DC input/output side 124.

The regulated DC link voltage is conditioned by the output inverter/rectifier 140, functioning as a DC-AC inverter module. In one embodiment, the output inverter/rectifier 140 has a similar configuration as the VSI module 120 illustrated in FIG. 2B, to provide VV, VF or FF power for various electrical loads through the first output filter 150. Suitable AC-DC and DC-AC power conversion modules and digital gating control techniques for variable frequency environments have been described in U.S. Patent Application Publication No. 20030218887, titled "Synchronous and Bi-directional Variable Frequency Power Conversion Systems," which is incorporated herein by reference in its entirety.

In a reverse power flow mode, either AC or DC power from a ground-based or an on-board source is converted to a regulated DC link voltage, and converted to conditioned AC power by the front-end input rectifier/inverter 120 to supply the stator windings of the synchronous machine 260, now operating as a motor/starter. The EXPS inverter 190 converts the regulated DC link voltage to an exciter power supply voltage.

In the case of ground-based or on-board DC power input, the DC—DC converter 220 converts the DC input to a regulated DC link voltage. In the case of an AC input, the output inverter/rectifier 140 converts the AC input to a regulated DC link voltage.

Figure 3:
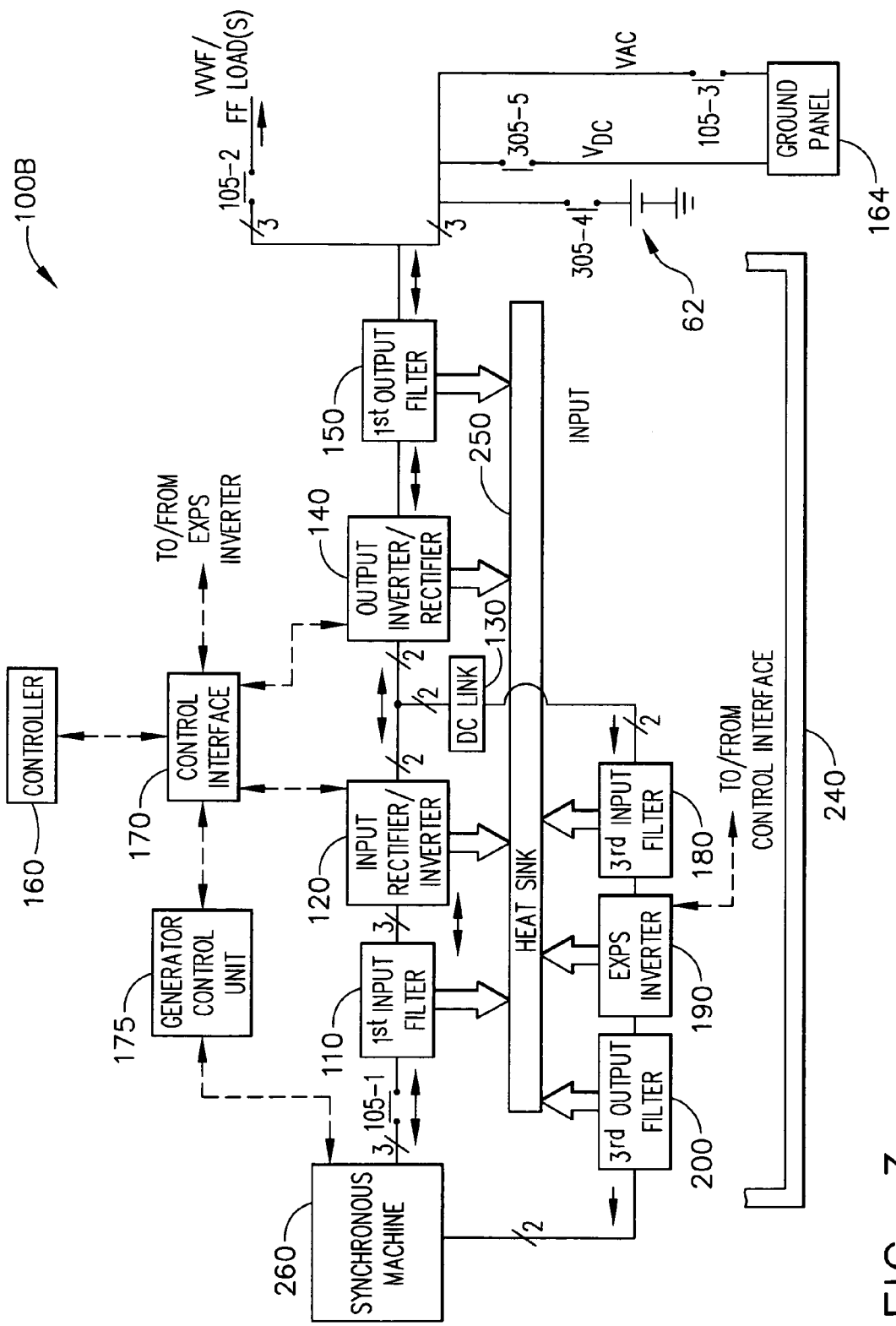
FIG. 3 illustrates an electrical power system utilizing a synchronous machine as both a generator and a starter in accordance with another embodiment of the present invention.

FIG. 3 is a block diagram illustrating an electrical power system utilizing a synchronous machine as both a generator and a starter in accordance with another embodiment of the present invention. As compared to the electrical power system 100A illustrated in FIG. 2A, the electrical power system 100B illustrated in FIG. 3 does not require a separate DC—DC converter 220 for converting DC voltage from a DC input power source to regulated DC voltage. Instead, during the reverse power flow mode, the output inverter/rectifier 140 in the embodiment of FIG. 3 is also used as a DC—DC converter in the case of DC power input.

The first output filter 150 is connected to ground-based DC input power (ground panel 164) via electrical contactor 305-5 to receive ground-based input DC power during the ground DC input, start mode and is connected to the DC battery 162 via electrical contactor 305-4 to receive on-board input DC power during the battery DC input, start mode.

As shown in FIG. 3, applying the output inverter/rectifier 140 as a boost DC—DC converter in reverse power mode eliminates the need for a separate DC—DC converter 220 and second input/output filters 230, 210. The high DC link voltage on DC link 130 can be used and converted to conditioned AC power by the front-end inverter/rectifier 120 to supply the stator windings of the synchronous machine 260 after filtering through the first input filter 110, now operating as a motor to achieve an engine start function. The EXPS inverter 190, in combination with third input/output filters 180, 200, provides the Exciter Power Supply for the synchronous machine 260.

Figure 4:
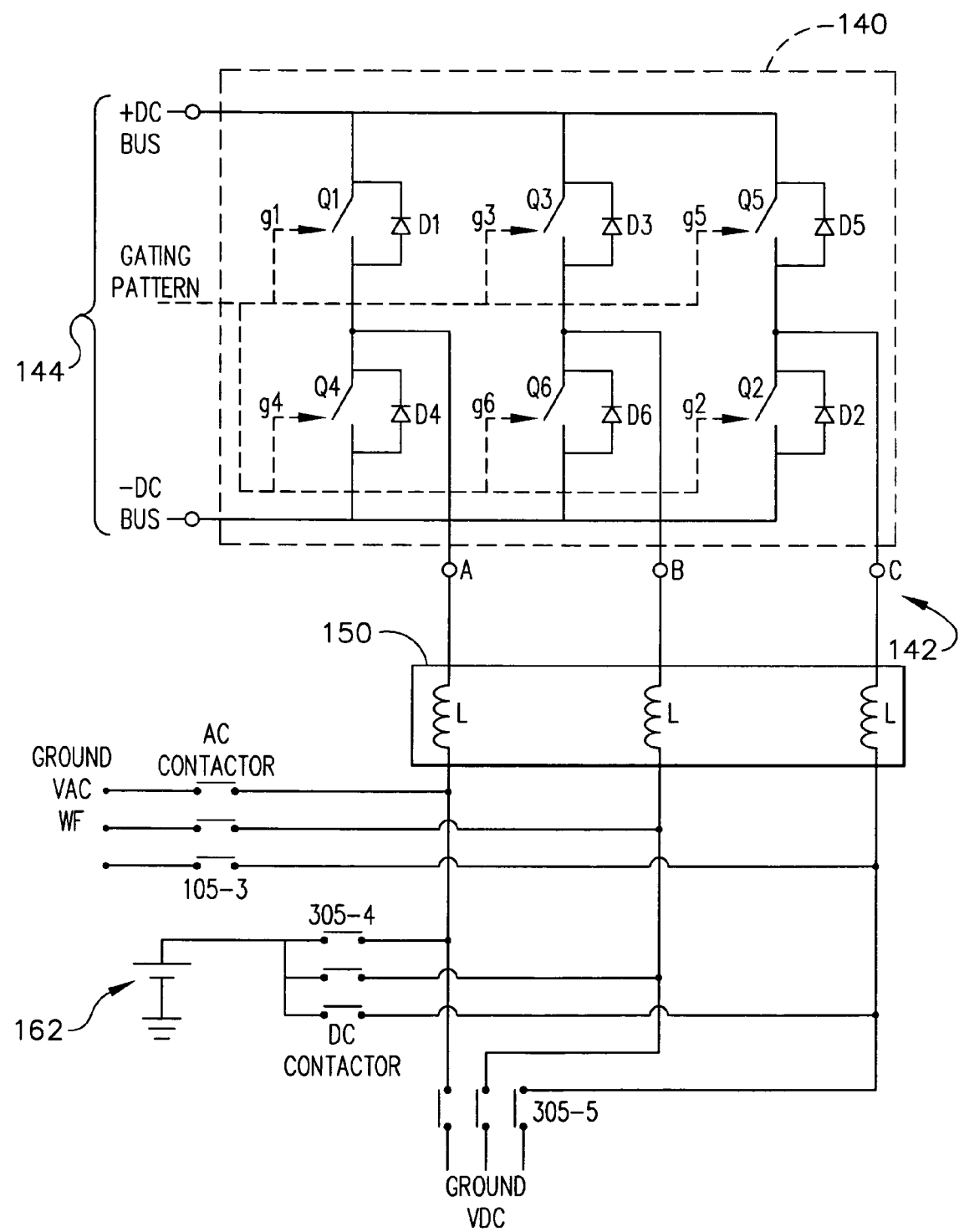
FIG. 4 illustrates a bi-directional voltage source inverter for either AC-DC, DC-AC, or DC—DC power conversion in accordance with an embodiment of the present invention.

FIG. 4 illustrates a configuration of the output inverter/rectifier 140 according to an exemplary implementation of the embodiment of the present invention of FIG. 3. In this implementation, the output inverter/rectifier 140 has the same VSI configuration illustrated in FIG. 2B, and has a first input/output side 142 for connecting to an on-board or ground-based DC power source via DC contactors 305-4, 305-5 or a ground-based AC power source via an AC contactor 105-3. It should be realized that various electrical contactor arrangements can be used in the implementation of FIG. 4. The output inverter/rectifier 140 is connected to the DC link on a DC link input/output side 144. The first input/output side 142 of the output inverter/rectifier 140 is also connected to aircraft load(s) via electrical contactor 105-2 (connection not shown in FIG. 4).

This arrangement for the output inverter/rectifier 140 performs DC-AC power conversion in forward power flow mode, AC-DC power conversion in reverse power flow mode when receiving AC input power from an AC source, and DC—DC conversion in a reverse power flow mode when receiving DC input power from a DC source in accordance with an embodiment of the present invention. For achieving any of these AC-DC, DC-AC, or DC—DC power conversion modes, the active controlled devices Q1—Q6 are gated using a Pulse Width Modulation (PWM) pattern to achieve the desired power conversion. Gating control for AC-DC and DC-AC conversion has been described in U.S. Patent Application Publication No.

20030218887. Furthermore, active gating control for DC—DC boost conversion is well known.

Figure 5A:
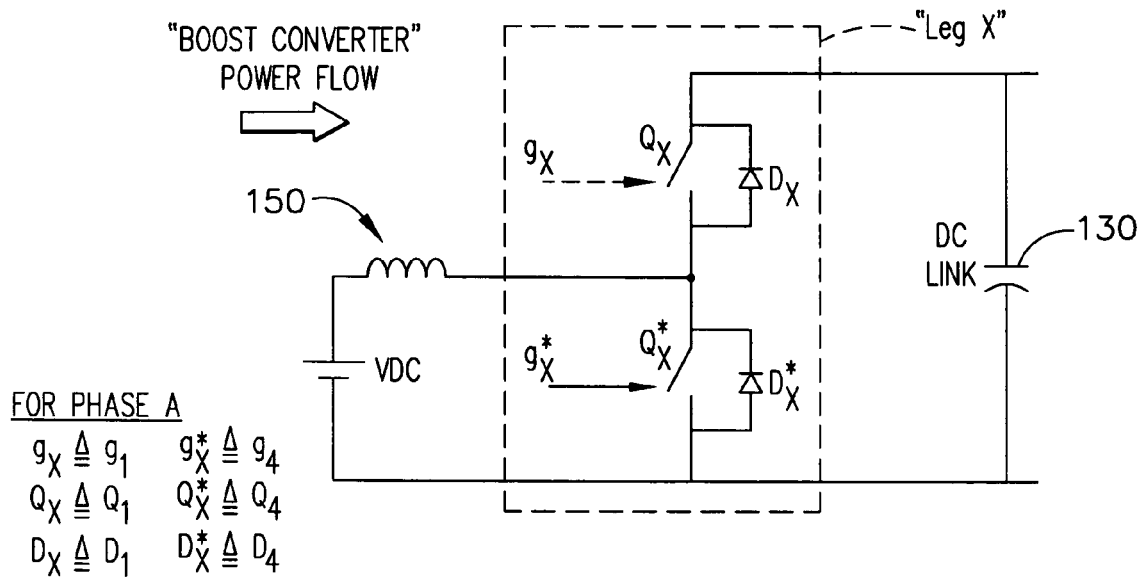
FIG. 5A illustrates one leg of a voltage source inverter for realizing a boost converter function in accordance with an embodiment of the present invention.

The arrangement illustrated in FIG. 5A shows that one of the lower controlled devices (Qx*, which is Q4 for Phase A) along with one of the upper anti-parallel diodes (Dx, which is D1 for Phase A) in the same leg x can be used to realize a DC—DC boost converter. Only one leg (Phase A) is shown in FIG. 5A for ease of illustration. During this boost converter mode, the upper controlled devices are kept turned-off. By using the plurality of all the three legs and phase shifting (by 120°) the corresponding gating patterns, reduced harmonic ripple on the DC link voltage and on-board DC battery can be achieved.

Figure 5B:
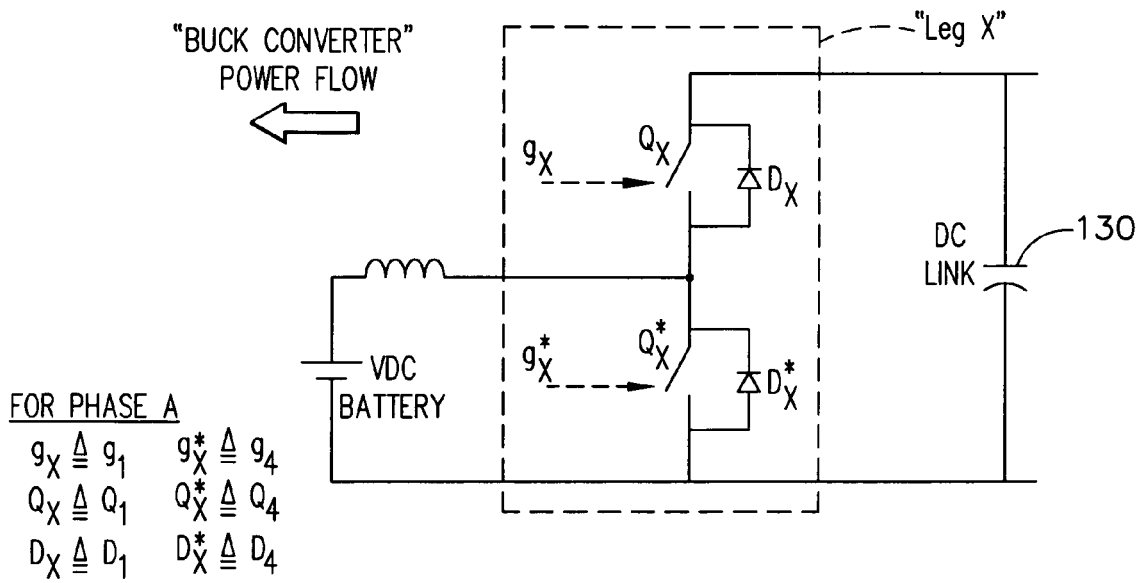
FIG. 5B illustrates one leg of a voltage source inverter for realizing a buck converter function in accordance with an embodiment of the present invention.

With the arrangement illustrated in FIG. 5B, one of the upper controlled devices (Qx, which is Q1 for Phase A) along with one of the lower anti-parallel diodes (Dx*, which is D4 for Phase A) in the same leg may be used to realize a step-down buck converter for charging the on-board battery. For example, battery charging may be performed when the output inverter/rectifier 140 is not being used for generator or starter modes of operation. Again, only one leg x (Phase A) is shown for ease of illustration. During this mode, the lower controlled devices Q4, Q6, Q2 are kept turned-off. By using the plurality of all the three legs and phase shifting (by 120°) the corresponding gating patterns, better filtering harmonic reduction can be achieved in the input 28 VDC battery current or the output DC link voltage 130 and its current ripple contents.

All the power conversion modules in the embodiments of FIG. 2A and FIG. 3 are integrated on the same heat sink 250, integrated into one chassis 240, and are controlled by one digital controller 160 via the control interface 170 in the forward or reverse power flow modes as required. It should be recognized that other power system functions, including Power Supply (PS), Gate Driver, Fault Protection and gating/control interface isolation, may be implemented on one circuit board. Furthermore, the synchronous machine 260 is controlled by a Generator Control Unit (GCU) 175, which in one implementation is continuously in communication with the controller 160 for realizing different modes of operation as required in the forward or reverse power flow modes as described above. As would be apparent to one of ordinary skill in the art, this integrated architecture, which allows bi-directional power flow enables multi-use of the same power conversion modules for different operating modes and results in significant cost, weight and volume reduction and is particularly beneficial for ease of thermal management, packaging and maintenance and achieving fuel economy and reducing overall life cycle costs.

It should be noted that the details of input/output filtering for achieving power quality/EMI requirements, isolation transformer, or DC/AC contactors are not described herein since these are well known in the art for achieving proper power flow to the DC link 130 either from a ground/on-board DC battery system or AC power.

What is claimed is:

1. A synchronous and bi-directional power conversion module for use in a variable frequency power conversion system, the power conversion module comprising:
    a first input/output side for AC power input/output and DC power source input;
    a second input/output side for DC link connection; and
    an active power switching arrangement, which is controlled by a gating pattern to perform multi-mode power conversion, wherein said active power switching arrangement is controlled to:
        convert DC link voltage from said DC link connection to an AC load supply voltage during a forward power mode;
        convert AC input power from said first input/output side to a regulated DC link voltage during an AC source input, reverse power mode; and
        convert DC input power from said first input/output side input to a regulated DC link voltage during a DC source input, reverse power mode.

2. The power conversion module according to claim 1, wherein
    said active power switching arrangement converts DC link voltage to a lower DC voltage during a battery charging mode.

3. The power conversion module according to claim 2, wherein said active power switching arrangement functions as a step-down buck converter in said battery charging mode.

4. The power conversion module according to claim 1, wherein said active power switching arrangement functions as a step-up boost converter during said DC source input, reverse power mode.

5. The power conversion module according to claim 1, wherein said DC power source input is connected to an on-board aircraft battery.

6. The power conversion module according to claim 1, wherein said first input/output side is connected to a ground-based DC power supply during DC source input, reverse power mode and a ground-based AC power supply during AC source input, reverse power mode.

7. A multi-mode power conversion system in which a synchronous machine operates as a generator during a forward power mode and a starter during a reverse power mode, said system comprising:
    a first multi-mode power conversion module, having an AC input/output connected to the synchronous machine, a DC input/output connected to a DC link, and an active power switching arrangement for converting multi-phase AC power from the synchronous machine to regulated DC link voltage during the forward power mode and converting DC link voltage to multi-phase AC power for supply to the synchronous machine during the reverse power mode; and
    a second multi-mode power conversion module, having a first input/output side for AC power input/output, a second input/output side for DC link connection, and an active power switching arrangement, wherein said active power switching arrangement is controlled to convert DC link voltage from said DC link connection to an AC load supply voltage during the forward power mode and convert AC input power from said first input/output side to a regulated DC link voltage during a reverse power mode,
    wherein said multi-mode power conversion system includes an electrical contactor between said first multi-mode power conversion module and the synchronous machine that is closed during both said forward power mode and said reverse power mode and does not include a electrical connection or electrical contactor between the first input/output side of said second multi-mode power conversion module and the synchronous machine.

8. The multi-mode power conversion system according to claim 7, wherein said first input/output side of said second multi-mode power conversion module is connected to a ground-based AC power supply during the reverse power mode.

9. The multi-mode power conversion system according to claim 7, wherein said synchronous machine generates multi-phase AC power during the forward power mode at a frequency between 320 Hz and 800 Hz.

10. The multi-mode power conversion system according to claim 7, further comprising:
a controller for controlling said first and second multi-mode power conversion modules.

11. A multi-mode power conversion system in which a synchronous machine operates as a generator during a forward power mode and a starter during a reverse power mode, said system comprising:
a first multi-mode power conversion module, having an AC input/output connected to the synchronous machine, a DC input/output connected to a DC link, and an active power switching arrangement for converting multi-phase AC power from the synchronous machine to regulated DC link voltage during the forward power mode and converting DC link voltage to multi-phase AC power for supply to the synchronous machine during the reverse power mode; and
a second multi-mode power conversion module, having a first input/output side for AC power input/output and for DC power source input, a second input/output side for DC link connection, and an active power switching arrangement, wherein said active power switching arrangement is controlled to:
convert DC link voltage from said DC link connection to an AC load supply voltage during the forward power mode;
convert AC input power from said first input/output side to a regulated DC link voltage during an AC source input, reverse power mode; and
convert DC input power from said first input/output side to a regulated DC link voltage during a DC source input, reverse power mode.

12. The multi-mode power conversion system according to claim 11, further comprising:
a controller for controlling said first and second multi-mode power conversion modules.

13. The multi-mode power conversion system according to claim 11, further comprising:
an exciter power supply inverter having an AC side connected to the synchronous machine and a DC side connected to a DC link, said exciter power supply inverter converting DC link voltage to an AC exciter power supply voltage.

14. The multi-mode power conversion system according to claim 13, wherein said exciter power supply inverter and said first and second multi-mode power conversion modules are integrated on the same heat sink for thermal management.

15. The multi-mode power conversion system according to claim 11, wherein
said active power switching arrangement of said second multi-mode power conversion module converts DC link voltage to a lower DC voltage during a battery charging mode.

16. The multi-mode power conversion system according to claim 15, wherein said active power switching arrangement of said second multi-mode power conversion module functions as a step-down buck converter in said battery charging mode.

17. The multi-mode power conversion system according to claim 11, wherein said active power switching arrangement of said second multi-mode power conversion module functions as a step-up boost converter during said DC source input, reverse power mode.

18. The multi-mode power conversion system according to claim 11, wherein said DC power source input of said second multi-mode power conversion module is connected to an on-board aircraft battery.

19. The multi-mode power conversion system according to claim 11, wherein said first input/output side of said second multi-mode power conversion module is connected to a ground-based DC power supply during the DC source input, reverse power mode and a ground-based AC power supply during the AC source input, reverse power mode.

20. The multi-mode power conversion system according to claim 11, wherein said synchronous machine generates multi-phase AC power during the forward power mode at a frequency between 320 Hz and 800 Hz.

* * * * *